Sept. 6, 1966  J. G. KAY  3,270,864
WORKPIECE CONVEYOR AND STORING UNIT
Filed Nov. 30, 1964  2 Sheets-Sheet 1

INVENTOR.
JOHN G. KAY
BY
Barnes, Kisselle, Raisch & Choate
ATTORNEYS

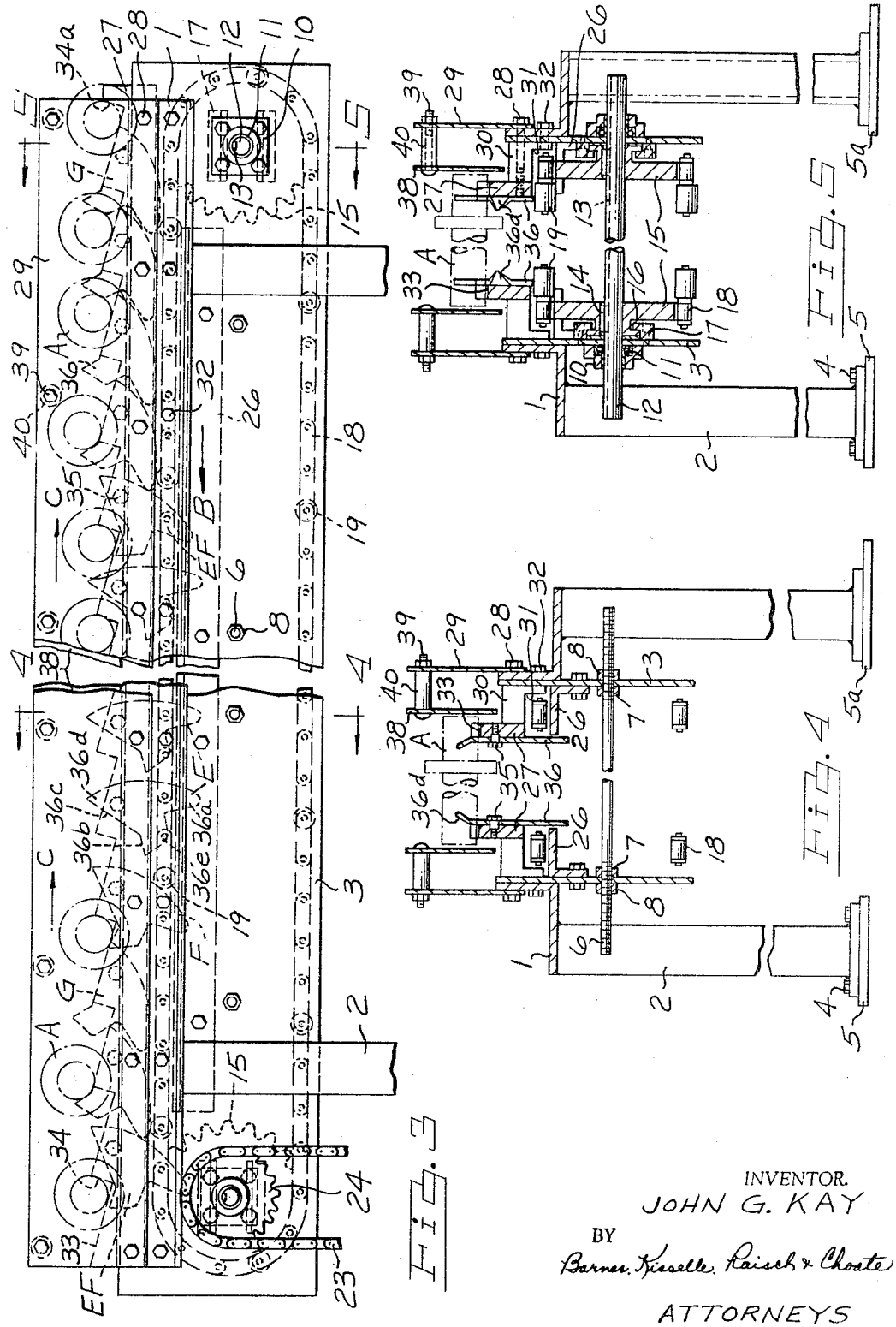

United States Patent Office 3,270,864
Patented Sept. 6, 1966

3,270,864
WORKPIECE CONVEYOR AND STORING UNIT
John G. Kay, Detroit, Mich., assignor to F. Jos. Lamb Company, Detroit, Mich., a corporation of Michigan
Filed Nov. 30, 1964, Ser. No. 414,748
12 Claims. (Cl. 198—219)

This invention relates to workpiece conveying and storing units, and is an improvement over Patent No. 2,948,386.

This invention aims to provide such a unit including opposed sawtooth tracks having a plurality of transversely aligned forwardly and downwardly inclined bearing surfaces along which workpieces are adapted to roll; aligned elevating cams for delivering the workpieces onto the bearing surfaces next in front on the tracks; and means on the cams for preventing advancement of workpieces to the forward ends of the bearing surfaces for engagement by the cams when the latter are in their elevated position. It often happens that such units are required to handle relatively short runs of workpieces of different lengths, and at all times bearing surfaces of sufficient width immediately adjacent the opposite extremities of the workpieces must be provided to insure that the latter travel at right angles along the bearing surfaces. Consequently it is necessary to provide rigidity and continuity of uniform track spacing throughout the length of the latter and also means for adjusting such spacing.

Another object of the invention is to provide such a unit wherein opposed pairs of elevating cams are mounted on the tracks for transferring workpieces from one opposed pair of bearing surfaces onto the next successive pair of bearing surfaces so that irrespective of the spacing between the latter the cams remain properly positioned relative to them.

A further object of the invention is to provide such a unit with separate means for simultaneously actuating opposed pairs of cams.

Another object of the invention is to provide such a unit wherein adjustment of the spacing between opposed cam actuating means is controlled by the spacing of the tracks, so that at all times the tracks, the cams and the actuating means therefore remains correctly positioned relative to one another.

Figure 1:
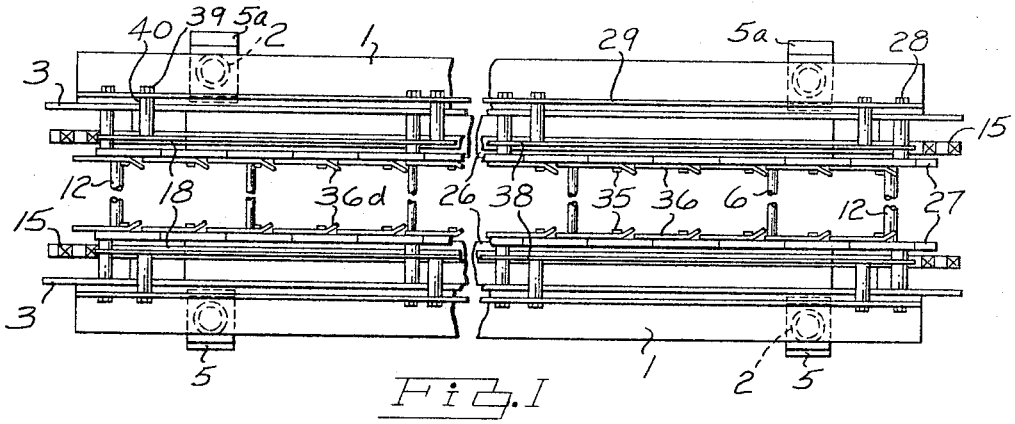
Figure 2:
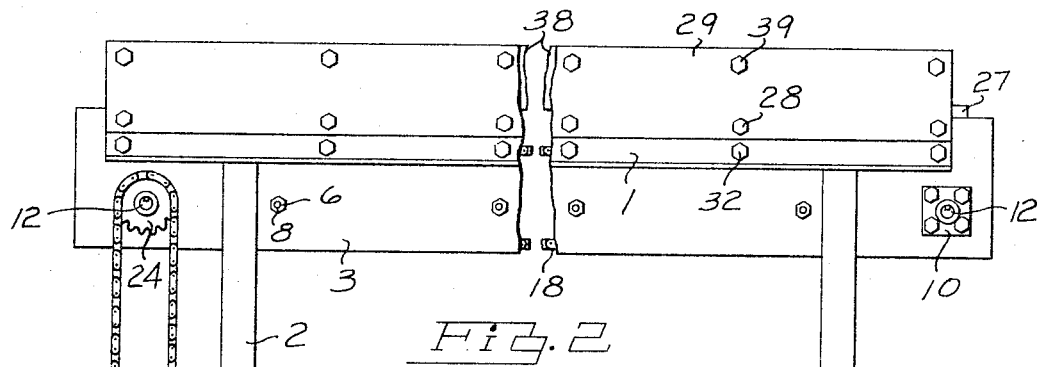
Figure 6:
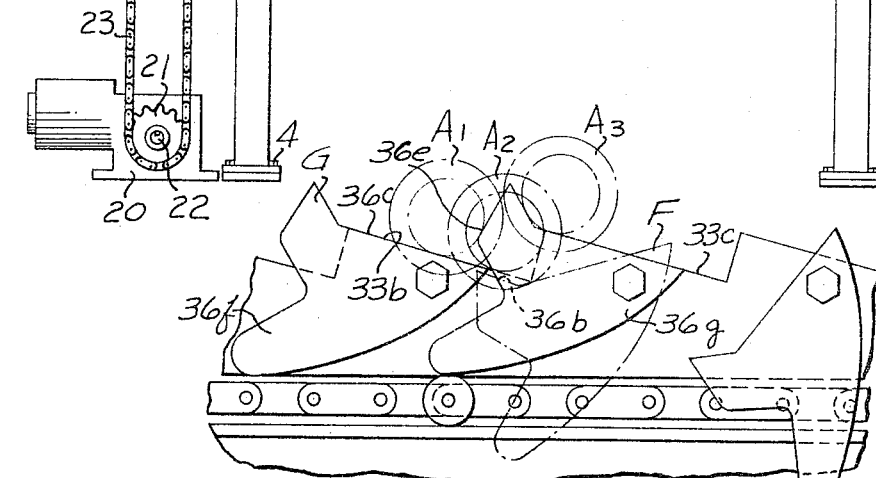
Figure 7:
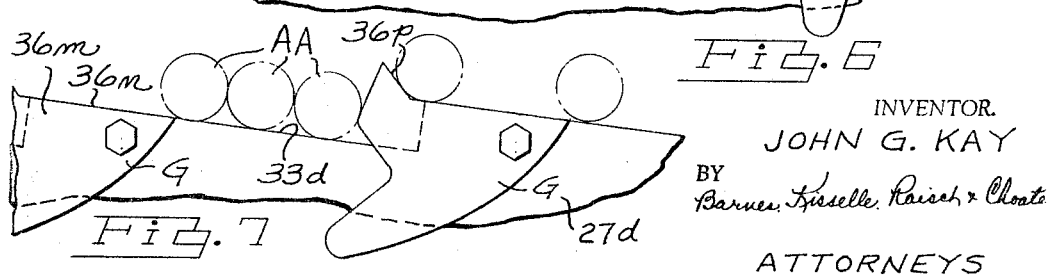

Having thus stated some of the objects of the invention I will now describe it more fully with the aid of the accompanying drawings, in which:

FIGURE 1 is a plan view of the invention, and
FIGURE 2 is a side elevation thereof;
FIGURE 3 is an enlarged side view of the upper portion of the unit;
FIGURES 4 and 5 are sections on the lines 4—4 and 5—5 respectively of FIGURE 3.
FIGURE 6 is an enlarged diagrammatic view showing the movement of a workpiece; and
FIGURE 7 shows a slight modification wherein the bearing surfaces are lengthened to receive a plurality of workpieces thereon at a time.

Referring to the drawings, the supporting structure includes two parallel longitudinal units which are laterally adjustable to one another. Each unit in this instance comprises a side frame member 1 of angle section the horizontal flange of which is secured as by welding upon longitudinally spaced supports 2, and secured to and parallel with the vertical flange is a plate 3. The supports 2 on one unit are permanently secured as by bolts 4 to floorplates 5, and the supports on the opposite unit rest upon corresponding floorpiece 5a for movement thereacross. Formed through the plates 3 at intervals therealong are a plurality of opposed openings for the passage of rods 6 which are threaded for some distance from their opposite extremities. Nuts 7 and 8 are normally tightened on the rods 6 against the inner and outer faces respectively of the plates 3 to hold the latter in their desired spaced relation. By loosening the nuts 8 adjacent either of the plates 3 and then tightening the nuts 7 thereagainst the spacing between the plates, and therefore between the side frame members 1, is increased, and by reversing this adjustment the spacing between them is reduced.

Secured to the outer faces of the plates 3 adjacent opposite extremities thereof are transversely aligned pillar blocks 10 in which conventional race bearings 11 are preferably mounted. Supported for rotation by and with the inner races of each transversely aligned pair of the bearings 11 is a shaft 12. These shafts extend outwardly beyond the pillar blocks 10 and through openings formed through the plates 3. Formed along the shafts 12 from their opposite extremities for at least a portion of their length are keyways 13 which are engaged by keys 14 mounted in the bores of sprockets 15 to permit movement of the latter therealong. 16 denotes annular grooves formed in the bosses of the sprockets which are engaged by keepers 17 secured to the inner faces of the plates 3. Thus during lateral adjustment of the plates 3 relative to one another each sprocket is held the same distance from the plate adjacent thereto, thereby retaining the sprockets in longitudinally aligned pairs, around each of which an endless chain 18 extends. 19 denotes contact rollers projecting horizontally inwardly from the chains at uniformly spaced intervals, each roller being in transverse alignment with one on the opposite chain. Secured in the present instance to the floor is a motor driven speed reducer 20 having a sprocket 21 mounted on its output shaft 22, and 23 denotes another endless chain which extends around both the sprocket 21 and another sprocket 24 mounted preferably for longitudinal adjustment along one of the shafts 12. It will be noted that the shafts 12 are rotated anti-clockwise, FIGURE 3, so that the upper links of the chain travel in the direction of the arrow B.

Secured to the inner faces of the plates 3 are opposed chain supports 26 which extend substantially the entire distance between each longitudinally aligned pair of sprockets 15 to support the links of the upper runs of chains 18 and retain them substantially horizontal throughout their length; and in order to facilitate their movement therealong roller chains are preferably employed. The portions of the contact rollers 19 adjacent the chain are also supported by the chain supports and it will be noted that the said rollers project inwardly beyond the latter.

Parallel sawtooth tracks 27 of uniform width throughout their length are spaced inwardly from the plates 3 and extend substantially throughout the length of the unit. Each track 27 is supported at intervals by cap screws 28 which extend through a guide rail support 29 hereinafter referred to, the adjacent frame member 1 and plate 3, and spacers 30 between the said plate and track. The spacers are also provided with downwardly projecting lugs 31 into which other cap screws 32 are threaded which also extend through the adjacent frame member 1 and plate 3.

Extending longitudinally along the upper surfaces of the sawtooth tracks 27 in the direction of the arrow C in which workpieces A are adapted to advance step by step therealong are a series of forwardly and downwardly inclined supporting surfaces 33 in transverse alignment with one another, and 34 denotes integral stops extending upwardly substantially at right angles from the forward and low extremities of the supporting surfaces to the rear and high extremities of the supporting surfaces immediately in front, thereby providing a continuous sawtooth form along each track. Opposed downwardly and forwardly inclined supporting surfaces start from the rear of the tracks, and their foremost supporting surfaces are shorter than the others and terminate in front stops 34a.

A series of transversely aligned pivot screws 35 project towards one another from the inner faces of the tracks 27. These pivot screws are uniformly spaced from one another below the supporting surfaces intermediately of their length, and are arranged in a horizontal row. Mounted for pivotal movement on the screws 35 are elevating cams 36 each transversely aligned pair of which is adapted to be turned simultaneously through substantially 90 degrees in a clockwise direction, FIGURE 3, by opposed pairs of contact rollers 19 on the upper links of the chains 18.

Each opposed pair of cams 36 include: arms 36a which, when the cams are in their normal gravity determined position E, extend substantially downward for engagement by opposed pairs of contact rollers 19; lifting lands 36b, which, when the cams are turned to position F, are in general alignment with the front extremities of opposed bearing surfaces 33 to pick up a workpiece thereon; and delivery lands 36c which, when the cams reach their position G are in alignment with the rear portions of the bearing surfaces immediately in front of those from which a workpiece was picked up as the cams passed through position F. In the arrangement shown in FIGURE 3, due to the exact shape and spacing of the cams, as one set is moved by a pair of contact rollers towards and through its position F it engages the cams immediately to the left and turns them to position EF adjacent but not through position F, so that the latter do not engage or pick up a workpiece until actuated directly by a pair of contact rollers. This advance movement of the cams is not necessary but permits the use of larger cams when their pivot axes are relatively close to one another. The front extremities 36d of each opposed pair of delivery lands 36c are inwardly bent towards one another as is clearly shown in FIGURE 4. The cams also have peripheral heels 36e of material depth beneath their lifting lands 36b which prevent a workpiece moving to the front extremities of the bearing surfaces 33 immediately behind as long as the cams ahead remain anywhere between their positions F and G. As soon as a workpiece rolls off its cams when the latter are in position G, due to their weight distribution they return to position E, but as long as the workpiece remains upon them its weight retains the cams in position G. The purpose of bending the forward extremities 36d of the delivery lands inwardly is to provide clearance between them and the heels 36e on the cams ahead of both the latter and the cams behind are retained in their positions G.

FIGURE 6 shows diagrammatically the advancement of a workpiece along the tracks. At position A1 a workpiece is still upon the delivery lands 36c of cams 36f which are then in position G and in alignment with the bearing surfaces 33b. As soon as it is free to do so, and not obstructed by heels 36e on cams ahead, the workpiece rolls from position A1 to the front extremities of the bearing surfaces 33b into position A2. When the lifting lands 36b of the cams 36g ahead pass upwardly through position F they pick up the workpiece at A2 and carry it to A3 at which time the cams 36g are in alignment with the rear portions of the bearing surfaces 33c immediately ahead.

Opposed longitudinal guide rails 38 extend parallel with and spaced the same distance outwardly from the tracks 27 in all adjusted positions of the latter since these rails are secured at intervals throughout their length to the supports 29 as by bolts 39 having spacers 40 thereon.

FIGURE 7 shows a slight modification wherein the bearing surfaces 33d of the tracks 27d are made proportionately longer than the corresponding bearing surfaces shown in FIGS. 1–6 to provide greater distance therealong in front of the delivery lands 36n of the cams 36m when the latter are in raised position G so that workpieces may accumulate thereon as shown at AA. Thus the cams are not prevented from returning to their lowered positions (not shown) until there are so many workpieces on the bearing surfaces that the last one remains at least in part on the delivery lands whereupon the cams are held stationary. It will be noted that the lifting lands 36p are usually only long enough to elevate one workpiece at a time to position G.

I claim:

1. A conveying unit comprising a support structure including a pair of generally horizontally spaced saw-tooth tracks mounted thereon, each track having a series of successive bearing surfaces which incline downwardly and forwardly in the direction of travel of the workpieces through the unit, there being a stop surface extending upwardly from the front lower extremity of each bearing surface to the higher rear extremity of the next successive bearing surface, the stop and bearing surfaces on the two tracks being transversely aligned whereby a workpiece is adapted to roll successively down each pair of transversely aligned bearing surfaces, cam means associated with each pair of transversely aligned bearing surfaces and pivotally supported for rotation in a generally vertical plane, said cam means being eccentric about their pivot axes whereby they are adapted to orient themselves to a predetermined position in response to gravity, means on each cam means adapted when the cam means is rotated through a predetermined angle to lift a workpiece from the front lower extremity of one bearing surface and deliver it to the higher rear extremity of the next successive bearing surface and endless drive means having cam actuating means thereon which when the drive means are driven in one direction are adapted to engage said cam means successively and rotate them from their lifting position to their delivery position whereby the workpieces move forwardly along said tracks in a progressive succession.

2. The combination in claim 1, wherein said endless drive means comprises a chain having an upper run and a lower run and including means for guiding one run of the chain in a path adjacent said cam means so that the actuating means are adapted to engage the cam means and means for driving said chain continuously in one direction.

3. The combination in claim 2, wherein said cam actuating means comprises a plurality of cam actuators mounted on said chain in generally uniformly spaced relation, the number of cam actuators on said chain being greater than two and the spacing between successive cam actuators being greater than successive cam means, whereby the successive cam means are actuated intermittently as distinguished from simultaneously.

4. The combination in claim 1, wherein each cam means comprises a pair of independent cams one adjacent each track and wherein said endless drive means comprises a pair of sprocket-driven chains one adjacent each row of cams.

5. The combination in claim 4, wherein said cams are pivotally mounted on said tracks and said tracks are adjustable transversely toward and away from each other.

6. The combination in claim 5, including a pair of transversely extending shafts located one adjacent each end of said tracks, a pair of sprockets on each shaft adjustable axially of the shafts in accordance with the transverse spacing of the tracks.

7. The combination in claim 6, wherein said support structure comprises a pair or transversely spaced frames extending longitudinally of each track and each supporting one of said tracks, said shafts interconnecting said frames in rigid relation and being adjustable transversely thereof to accommodate workpieces of different lengths.

8. A conveying unit comprising a supporting structure including opposed side frame members, a continuous track mounted on each side frame member, each track having a plurality of forwardly and downwardly inclined bearing surfaces formed in sequence therealong and upwardly directed stops extending from the low front extremity of each bearing surface to the high rear extremity of the bearing surface immediately in front thereof, the bearing surfaces and the stops on one track being in transverse alignment with those on the other track, whereby a workpiece is adapted to roll consecutively down each opposed pair of bearing surfaces, means for adjusting the lateral spacing between the tracks, transversely aligned pairs of cams, one cam of each pair being pivotally mounted on each track, means on each transversely aligned pair of cams for lifting a workpiece from the front extremities of one transversely aligned pair of bearing surfaces and delivering it onto the rear portions of the bearing surfaces immediately ahead, means mounted on the side frame members for intermittently turning both cams of each aligned pair simultaneously through their lifting position to their delivery position, said cams being adapted to return to their initial positions by gravity, means on the cams for preventing a workpiece advancing to the front extremities of the bearing surfaces from which said cams are adapted to lift a workpiece when said cams are between their lifting and their delivery positions, and means on the cams which when said cams are in delivery position extend beneath a workpiece resting upon the front portions of the adjacent bearing surfaces whereby said workpiece prevents the return of said cams to their initial position until the next successive cam in a forward direction lifts the last mentioned workpiece to the next successive bearing surface, said means for turning the cams through their lifting positions to their delivery positions including transversely aligned shafts mounted for rotation between the side frame members adjacent opposite extremities thereof, sprockets mounted on each shaft for rotation therewith and axial adjustment therealong, means for holding each sprocket on one shaft in alignment with one sprocket on the other shaft, an endless chain extending around each aligned pair of sprockets, and spaced contact members secured to each chain, each contact member on one chain being in transverse alignment with one contact member on the other whereby each aligned pair of contact members is adapted to turn each transversely aligned pair of cams consecutively through their lifting to their delivery position.

9. The combination in claim 8, including means for laterally adjusting the sprockets along their shafts by lateral adjustment of the tracks relative to one another.

10. A conveying unit comprising a supporting structure including opposed side frame members, a continuous track mounted on each side frame member, each track having a plurality of forwardly and downwardly inclined bearing surfaces formed in sequence therealong and upwardly directed stops extending from the low front extremity of each bearing surface to the high rear extremity of the bearing surface immediately in front thereof, the bearing surfaces and the stops on one track being in transverse alignment with those on the other track, whereby a workpiece is adapted to roll consecutively down each opposed pair of bearing surfaces, means for adjusting the lateral spacing between the tracks, transversely aligned pairs of cams, one cam of each pair being pivotally mounted on each track, means on each transversely aligned pair of cams for lifting a workpiece from the front extremities of one transversely aligned pair of bearing surfaces and delivering it onto the rear portions of the bearing surfaces immediately ahead, means mounting on the side frame members for intermittently turning both cams of each aligned pair simultaneously through their lifting position to their delivery position, said cams being adapted to return to their initial positions by gravity, means on the cams for preventing a workpiece advancing to the front extremities of the bearing surfaces from which said cams are adapted to lift a workpiece when said cams are between their lifting and their delivery positions, means on the cams which when said cams are in delivery position extend beneath a workpiece resting upon the front portions of the adjacent bearing surfaces whereby said workpiece prevents the return of said cams to their initial position until the next successive cam in a forward direction lifts the last mentioned workpiece to the next successive bearing surface, said means for adjusting the spacing of the tracks comprising means for adjusting the spacing of the side frame members relative to one another, each track being secured to one of the side frame members.

11. A conveying unit comprising a supporting structure including opposed side frame members, a continuous track mounted on each side frame member, each track having a plurality of forwardly and downwardly inclined bearing surfaces formed in sequence therealong and upwardly directed stops extending from the low front extremity of each bearing surface to the high rear extremity of the bearing surface immediately in front thereof, the bearing surfaces and the stops on one track being in transverse alignment with those on the other track, whereby a workpiece is adapted to roll consecutively down each opposed pair of bearing surfaces, means for adjusting the lateral spacing between the tracks, transversely aligned pairs of cams, one cam of each pair being pivotally mounted on each track, means on each transversely aligned pair of cams for lifting a workpiece from the front extremities of one transversely aligned pair of bearing surfaces and delivering it onto the rear portions of the bearing surfaces immediately ahead, means mounted on the side frame members for intermittently turning both cams of each aligned pair simultaneously through their lifting position to their delivery position, said last-mentioned means being laterally adjustable to suit the spacing between said aligned pairs of cams, said cams being adapted to return to their initial positions by gravity, means on the cams for preventing a workpiece advancing to the front extremities of the bearing surfaces from which said cams are adapted to lift a workpiece when said cams are between their lifting and their delivery positions, and means on the cams which when said cams are in delivery position extend beneath a workpiece resting upon the front portions of the adjacent bearing surfaces whereby said workpiece prevents the return of said cams to their initial position until the next successive cam in a forward direction lifts the last-mentioned workpiece to the next successive bearing surface.

12. A conveying unit comprising a support structure including a pair of generally horizontally spaced sawtooth tracks mounted thereon, each track having a series of successive bearing surfaces which incline downwardly and forwardly in the direction of travel of the workpieces through the unit, there being a stop surface extending upwardly from the front lower extremity of each bearing surface to the higher rear extremity of the next successive bearing surface, the stop and bearing surfaces on the two tracks being transversely aligned whereby a workpiece is adapted to roll successively down each pair of transversely aligned bearing surfaces, cam means associated with each pair of transversely aligned bearing surfaces and supported for movement in a generally vertical plane, means biasing said cam means to orient them to a predetermined position, means on each cam means adapted when the cams are moved in said vertical plane to lift a workpiece from the front lower extremity of one bearing surface and deliver it to the higher rear extremity of the next successive bearing surface and endless drive means having cam actuating means thereon which when the drive means are driven in one direction are adapted to engage said cam means successively and move them from their lifting position to their delivery position whereby the workpieces move forwardly along said tracks in a progressive succession.

References Cited by the Examiner

UNITED STATES PATENTS 2,948,386  8/1960  Kay _____ 198—219

EVON C. BLUNK, Primary Examiner.

EDWARD A. SROKA, Examiner.